April 8, 1969    H. D. ARNOLD    3,437,853
ELECTRIC MOTOR WITH REMOVABLE END SHIELDS AND METHOD OF MAKING IT
Filed Aug. 28, 1967
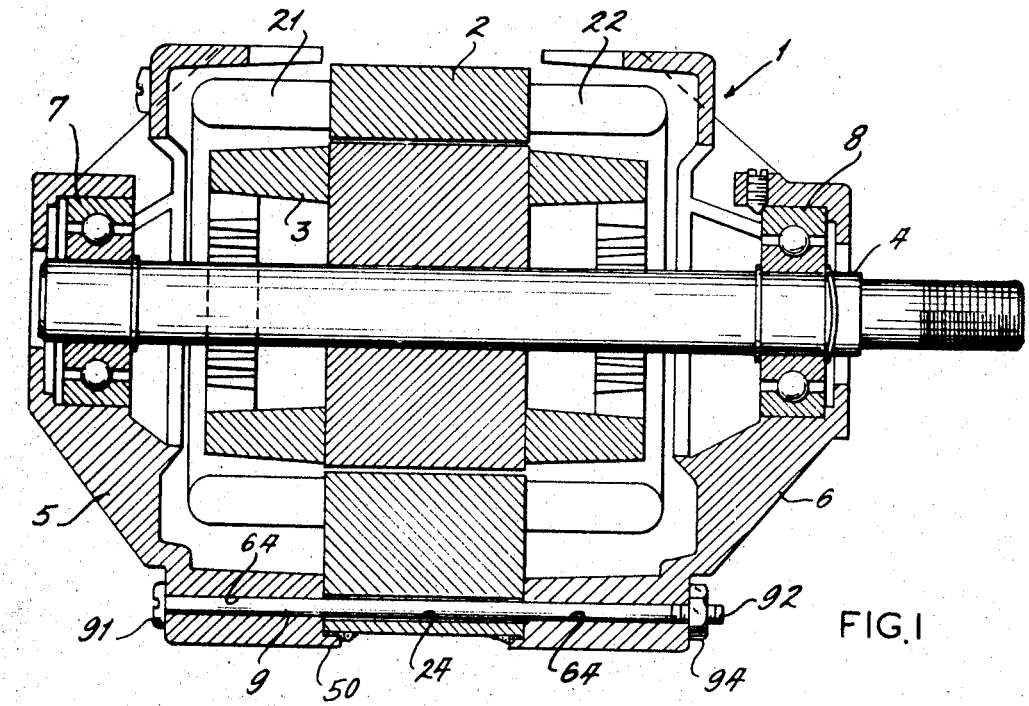
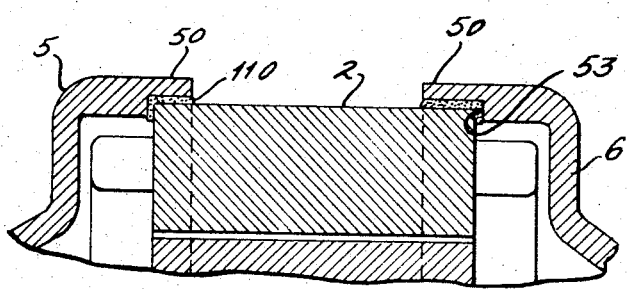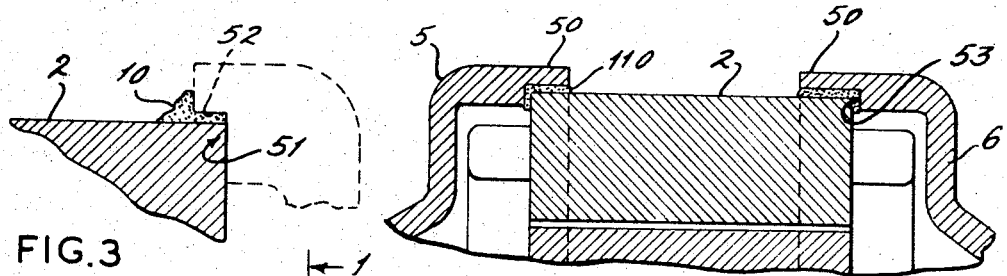
FIG.3    FIG.4
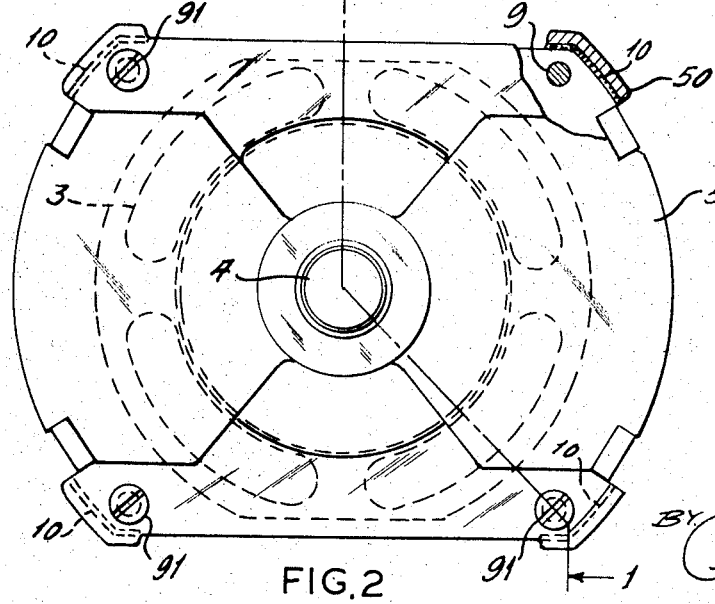
FIG.2
INVENTOR:
HAROLD D. ARNOLD
BY
ATTORNEY, United States Patent Office 3,437,853
Patented Apr. 8, 1969

3,437,853
ELECTRIC MOTOR WITH REMOVABLE END SHIELDS AND METHOD OF MAKING IT
Harold D. Arnold, Bellefontane Neighbors, Mo., assignor to Emerson Electric Co., a corporation of Missouri
Filed Aug. 28, 1967, Ser. No. 663,624
Int. Cl. H02k 15/14
U.S. Cl. 310—42
10 Claims

ABSTRACT OF THE DISCLOSURE

An electric motor with removable and shields and a method of making it in which a rotor is positioned within a stator by shims in the air gap, end shields are mounted on the rotor shaft, a part of each end shield extending axially over a part of the stator and spaced radially therefrom, one of the parts is coated with a released agent, and curable adhesive (e.g. epoxy) is placed between the parts and adhered to only one of them. While the rotor stator and end shields are held in the desired configuration with respect to one another, the adhesive is cured. The cured, solid plastic does not adhere to the surface which has been coated with release agent. The end shields can then be removed, and replaced, the bridges of cured adhesive material adhered to one part serving as permanent locating bosses and the end shield being mounted in any suitable selectively demountable way, as by stator screws and nuts, or through bolts. These are preferably in place during the curing process and can be coated with some kind of release agent to ensure that no adhesive adheres to them.

Background of the invention

Conventionally, fractional horsepower electric motors have been made with a stator shell and two end shields, with rabbets machined in them to insure concentricity of the stator and rotor. Such a construction is expensive, because of the machining step, and, in large scale production, requires the provision of a relatively wide air gap between the stator and the rotor, because the location of the rotor with respect to the stator is determined by the relation of the shell and end shield rabbets, rather than upon the relation of the stator and the rotor. On the other hand, such a construction has the advantage of providing a motor which can be disassembled and reassembled readily, to permit repair and replacement of elements of the motor. Recently, motors have been produced commercially by cementing end shields to the stator core while maintaining the desired air gap spacing with shims, which, after the cementing has been accomplished, are removed. An illustrative example of such a method is described in Thompson and Wightman U.S. Patent 3,165,- 816, and of a resulting motor, in Thompson and Wightman Patent No. 3,176,176.

These cemented motors have the advantage of cheapness, and the method, of producing a motor with excellent concentricity of the stator and rotor, which permits the commercial production of motors with a small air gap. Such motors suffer from the disadvantage, however, that they cannot economically be disassembled, once the cement is cured. Accordingly, defects which could readily be cured in a conventionally constructed motor, require that the entire motor be scrapped in the case of a cemented motor.

One of the objects of this invention is to provide a dynamo-electric machine which combines the advantage of concentricity and narrow air gap of the cemented machine with the ease of disassembly and reassembly of the conventional machine.

Another object is to provide a method of producing such a machine which is simple, economical in cost, and susceptible to use in mass production.

Other objects will become apparent to those skilled in the art in the light of the following description and accompanying drawing.

Summary of the invention

In accordance with this invention, generally stated, a dynamo-electric machine is provided in which parts on a stator and end shield are in axial coextension and radial displacement with respect to one another, and a bridge of cured adhesive material is adhered to one part and is free from adhesion to the other part, the material constituting the sole radial locating means between the stator and the end shield.

In the process of manufacturing such a machine, one of the parts is coated in the area of axial coextension of the parts with a release agent. The other part is uncoated. A plastic material adhesive to the uncoated part and curable to a solid state is introduced to the complementary area of the uncoated part. The stator and end shield are held in their ultimately desired relative configuration, with their parts in axial coextension and radial displacement, the radial space between them being bridged by the plastic material in the area through which the material is introduced, and while the stator and end shield are so held, the adhesive plastic material is cured. The stator and end shield can then be separated, the adhesive, now set to a solid, parting along the coated area. Preferably, the stator and rotor are held in their desired positions during the curing process by means of shims in the air gap. Preferably, also, the end shield is mounted against axial displacement in use, by means of stator bolts or through-bolts or the like, which are preferably in place during the curing process, and which can also be coated with release agent to insure that neither they nor the nuts which normally complete the mounting means are inadvertently adhered to the end shield or in the case of the nuts and bolts to one another.

The release agent can be any suitable material. A tetrafluoroethylene spray, such, for example, as "T.F.E. coat," a product of Camie Company, has been found satisfactory.

Brief description of the drawing

In the drawing,

FIGURE 1 is a sectional view taken along the line 1—1 of FIGURE 2;

FIGURE 2 is a view in end elevation, partly broken away, of one illustrative embodiment of dynamo-electric machine of this invention;

FIGURE 3 is a fragmentary sectional view showing a portion of a stator core with a bridging piece of cured adhesive material adhered to the stator core, an end shield being indicated in dotted lines; and FIGURE 4 is a fragmentary sectional view showing a stator core with two end shields, wherein the adhesive bridging material is adhered to parts of the end shields and free of adhesion to the stator core.

Description of the preferred embodiments

Referring now to the drawing, particularly FIGURES 1–3 for one illustrative embodiment of dynamo-electric machine of this invention, reference numeral 1 indicates the complete machine, which includes a stator 2, a rotor 3, with the usual rotor shaft 4, end shields 5 and 6, and bearings 7 and 8, carried by end shields 5 and 6 respectively. In this, illustrative embodiment, the stator is a slab sided "square" stator with end turns 21 and 22 projecting from the stator core. The stator core has four through-bolt holes 24 and the end shields, four corresponding holes 64, running through them, through which through-bolts 9 extend. Each of the through-bolts 9 has a head 91 at one end, and a threaded section 92 at the other end on which nuts 94 are threadedly mounted. Each throughbolt hole 24 is sufficiently larger in diameter than the shank of the throughbolt 9 to permit some lateral play between the end shields and the stator core.

As shown particularly in FIGURE 2, each of the end shields has integral with it four ears 50, extending axially toward the stator core. As shown particularly in FIGURE 3, each of the ears 50 has a step 51 at its free end which provides a part 52 which is coextensive axially with and spaced radially from a part of the (outer surface of the) stator core 2.

Between the part 52 of each of the ears 50 and the coextensive area of the stator 2, is a bridge of cured adhesive material 10. In the embodiment of machine shown in FIGURES 1–3, the adhesive material is adhered to the stator core, and is free of adhesion to the end shield ears, so that the end shields can be removed from the stator merely by removing the nuts 94, and pulling the end shields axially away from the stator.

In the manufacture of the dynamo-electric machine shown in FIGURES 1–3, the rotor 3, mounted on the shaft 4, is placed within the bore of the stator 2, and is located with respect to the stator bore by means of shims or spacers, placed in the air gap between the stator and the rotor. The outer surface of the stator core, particularly in the areas which are to be coextensive with parts 52 of the end shields, is made or kept clean, i.e., respective to adhesion. The parts 52, and the radial surface of the step 51 as well are coated with a release agent, such as tetrafluoroethylene or silicone, for example. The end shields are then put in place with the shaft 4 projecting into or through the bearings 7 and 8, and the through bolts 9, which may also have been coated with release agent, are put through the holes 64 in the end shields and holes 24 in the stator, to locate the end shields with respect to the stator circumferentially.

A suitable adhesive, for example epoxy cement of the type used in the Thompson and Wightman process described in Patent No. 3,165,816 or Wightman et al. application Ser. No. 417,428 is provided within the entire coextensive area between the part 52 and the stator 2. The adhesive can either be applied to the stator before the end shields are put into place, or it can be forced between part 52 and stator after the end shields are in place. In either event, sufficient of the adhesive is preferably used not only to fill the space between the part 52 and the stator, but also to pile up against the outer radial edge of the ear 50, as shown particularly in FIGURE 3.

The adhesive material 10 is then cured as by heating, after which it is strongly adhered to the stator 2, but is free from adherence to the ears 50.

Ordinarily, if the motor tests properly, it is unnecessary to remove the end shields before the motor is put into use. However, if some defect is detected such, for example, as a defective bearing, or a short circuit in the stator winding, the motor can be disassembled, the defect cured, and the motor reassembled. The same thing is true after the motor has been put into use.

In the embodiment shown in FIGURE 4, all of the parts are identical, except for the placement and adhesion of adhesive material 110. In this embodiment, the adhesive material is adhered to the ears 50 and is free of adherence to the stator 2. The adhesive 110 is also distributed both between the part 52 and the stator 2, and also between the outer radial face of the stator 2 and a radial surface 53 of the step 51. This arrangement has the disadvantage that the adhesive is somewhat more difficultly placed. It has the advantage that the adhesive serves to permit a more positive "floating" location of the end shield with respect to the stator, both axially and radially to accommodate such slight distortion of the radial faces of the stator and end shield, and cocking of the bearings as may occur. In the other embodiment, these distortions are accommodated by the stop formed by the "excess" adhesive, but not as positively.

The method of manufacture of the machine of the embodiment shown in FIGURE 4 is identical with that of the embodiment shown in FIGURES 1–3 except that the release material is applied to the appropriate areas of the outer radial and circumferential surfaces of the stator rather than to the ears of the end shield and the adhesive is distributed as shown in FIGURE 4.

Numerous variations in the construction and method of manufacture of the dynamo-electric machine of this invention, within the scope of the appended claims, will occur to those skilled in the art in the light of the foregoing disclosure. For example, either cast or sheet metal end shields can be used. In the latter, the ears can be bent to provide the stepped end. Other means of fastening the end shields, besides throughbolts, can be used, such as stator studs and Tinnerman clips. In the method, the adhesive can be applied first to the release agent-coated part as a carrier to introduce the adhesive between the parts and to the uncoated part. These variations are merely illustrative.

Having thus described the invention, what is claimed and desired to be secured by Letters Patent is:

1. In the process of manufacturing a dynamo-electric machine having a stator, a rotor, a radial air gap between said stator and said rotor, a rotor shaft and at least one end shield mounted at one axial end of the stator, said end shield carrying a rotor shaft journaling bearing, and having at least one part in axial coextension and radial displacement with a part of the stator, the improvement comprising coating one of said part of said stator and part of said end shield in the area of their axial coextension with a release agent; introducing to the complementary area of the other of said parts a plastic material adhesive to the said other of said parts and curable to a solid state, holding the said stator and end shield in their ultimately desired relative configuration with their said parts in axial coextension and radial displacement the radial space between them being bridged by said plastic material in the area to which the said material is introduced, and while said stator and end shield are so held, curing said adhesive plastic material.

2. The process of claim 1 wherein the stator and rotor are held in place by shims in the air gap and the rotor shaft extends within the bearing carried by the end shield during the curing step.

3. The process of claim 2 wherein axially extending threaded mounting means projecting through openings in the end shield are in place during the curing steps.

4. The process of claim 2 wherein the axially extending threaded means are bolts projecting from a radial surface of the stator, and nuts are mounted thereon to hold the end shield against axial displacement.

5. The process of claim 1 wherein the area to which the release agent is applied has both axial and radial surfaces and the adhesive material extends along both axial and radial surfaces.

6. The process of claim 1 wherein the adhesive material is an epoxy resin.

7. The process of claim 6 wherein the effective ingredient of the release agent is polytetrafluoroethylene.

8. The process of claim 1 including the further steps of separating the end shield from the stator, and remounting it with selectively disassemblable means.

9. The process of claim 1 wherein an end shield is similarly mounted on each of two opposite ends of the stator.

10. In a dynamo-electric machine having a stator, and rotor, a rotor shaft and end shields carrying bearings within which said rotor shaft is journaled, the improvement comprising parts on said stator and end shields in axial coextension and radial displacement with respect to one another, and a bridge of cured adhesive material adhered to one part and free from adhesion to the other part, said material constituting the sole radial locating means between said stator and said end shields.

References Cited

UNITED STATES PATENTS

| | | | |
|---|---|---|---|
| 3,165,816 | 1/1965 | Thompson et al. | 310—42 X |
| 3,256,590 | 6/1966 | Myers | 29—205 X |
| 3,320,660 | 5/1967 | Otto | 29—596 |
| 3,359,628 | 12/1967 | Rutledge et al. | 29—596 |

WARREN E. RAY, *Primary Examiner.*

U.S. Cl. X.R.

310—43, 89; 29—596